Aug. 4, 1953     J. H. KNOWLES ET AL     2,647,733
AGITATOR DEVICE FOR DIGESTER TANKS
Filed May 29, 1952     4 Sheets-Sheet 1

INVENTORS
John H. Knowles
William G. Sutcliffe
By William J. Fox
ATTORNEY

Aug. 4, 1953

J. H. KNOWLES ET AL 2,647,733

AGITATOR DEVICE FOR DIGESTER TANKS

Filed May 29, 1952

INVENTORS
John H. Knowles
William G. Sutcliffe
By William J. Fox
ATTORNEY

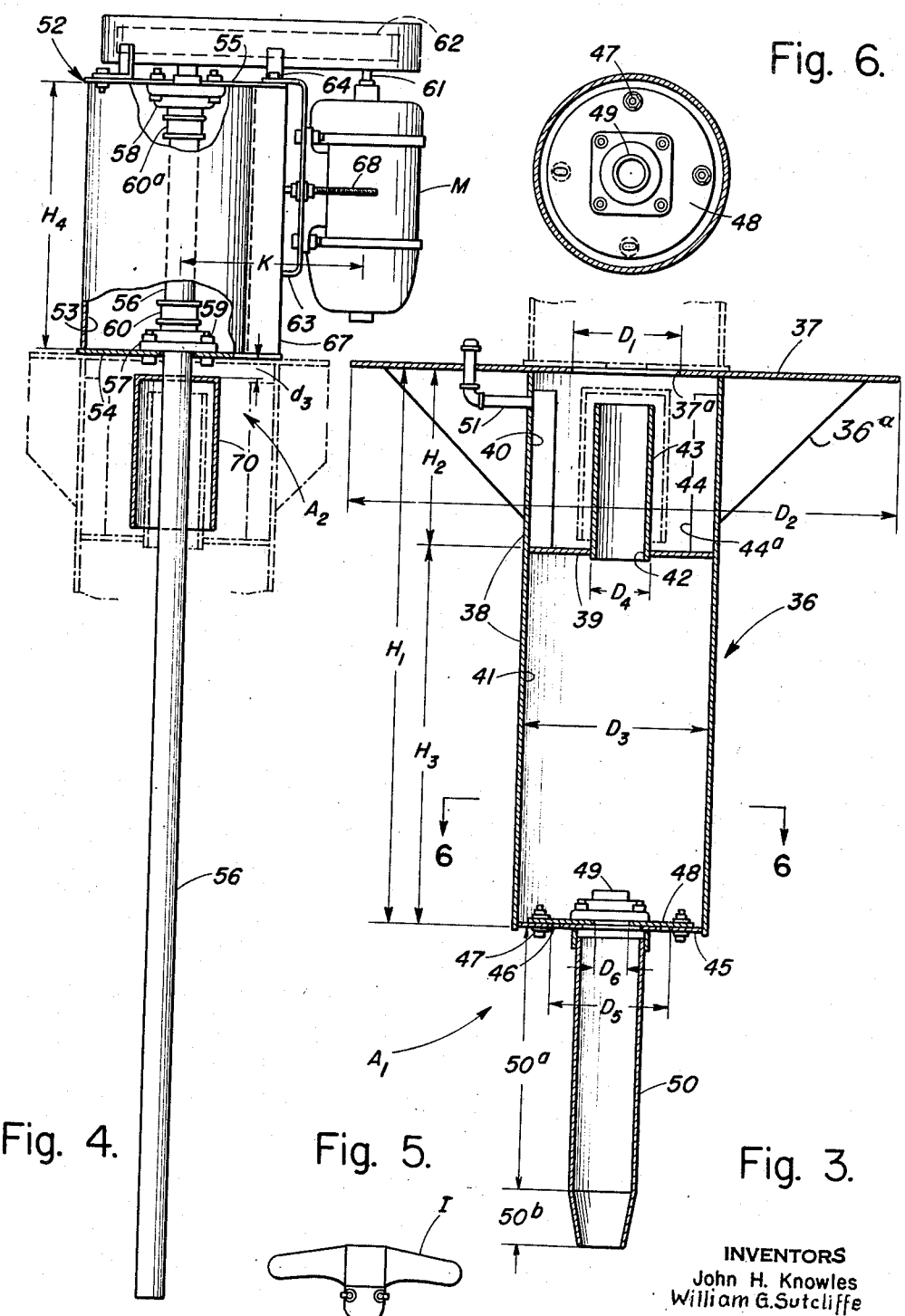

Aug. 4, 1953    J. H. KNOWLES ET AL    2,647,733
AGITATOR DEVICE FOR DIGESTER TANKS
Filed May 29, 1952    4 Sheets-Sheet 4

INVENTORS
John H. Knowles
William G. Sutcliffe
By William J. Fox
ATTORNEY

Patented Aug. 4, 1953

2,647,733

UNITED STATES PATENT OFFICE 2,647,733

AGITATOR DEVICE FOR DIGESTER TANKS

John H. Knowles, Larchmont, and William G. Sutcliffe, Harrison, N. Y., assignors to The Dorr Company, Stamford, Conn., a corporation of Delaware Application May 29, 1952, Serial No. 290,718

4 Claims. (Cl. 259—108)

This invention relates to closed digester tanks for anaerobic digestion of liquid-suspended organic matter, for example sewage sludge, and more particularly to agitating devices therefor.

Where, for instance, digested sludge is produced from a single tank, a closed digester tank holds a body of sewage sludge undergoing digestion by anaerobic bacteria which by feeding upon the suspended organic sewage matter convert raw sludge from an offensive to an inoffensive state while gaseous by-products of such bacterial conversion or digestion are withdrawn from a so-called gas dome at the top of the tank. Fresh sewage sludge from sewage clarifiers is periodically pumped into the tank to feed into an upper zone of the body of sewage sludge which is being agitated, while digested sludge from a quiescent bottom zone is being withdrawn to a point outside the tank; digester supernatant overflows through a water seal from the tank, the liquid level in the tank being determined by the height of the supernatant overflow level and by the pressure of the gaseous by-products upon the body of liquid in the tank and it may therefore vary somewhat with variations in the gas pressure. Mechanical agitation is periodically imparted to the upper portion of the body of sewage sludge in order that there may be maintained and promoted a healthy anaerobic bacterial action within the upper zone of the sewage body where most of the active anaerobic digestion is taking place, while digested sewage matter finds its way into the more quiescent bottom zone of the tank whence it is withdrawn as digester sludge.

More particularly, this relates to improvements in agitator-propeller devices which are mounted upon and carried by the top or dome of the tank, and which are employed for imparting to the sewage solids in the tank a degree of agitation and migration or circulation that is conducive to maintaining the digestion of the solids by anaerobic bacteria continually effective.

Such an agitator-propeller unit usually comprises an agitator shaft extending vertically through an opening in the top of the digester tank, with an agitator-propeller mounted at the free lower end of the shaft within the tank, and motor drive means provided at the upper end of the shaft outside the tank. The propeller shaft is rotatable in and guided by frame construction extending within the tank. For example, the shaft extends through a horizontal supporting closure plate or flange and has gas-sealing relationship therewith, the flange in turn being marginally supported upon and removably fastened to the edge portion of an opening in the tank top and in gas-sealing relationship therewith. Motorized drive means for the vertical shaft are carried by the flange.

This invention proposes to provide a self-contained individually powered agitator-propeller unit which by means of a horizontal flange is mountable upon the top opening of the digester tank and is liftable therefrom as a unit by detaching the flange from the tank. The vertical agitator shaft of such a unit should extend from the tank top a required distance downwardly into the tank with the propeller operating a suitable distance below the liquid level in the tank. The agitator unit as herein proposed therefore comprises as a part thereof a guide- and bearing-structure for the shaft, which extends an appreciable distance downwardly from the supporting flange but terminates above the liquid level, while the free lower end portion of the agitator shaft extends a distance below the liquid level.

Thus, there arises the problem of providing such an agitator unit of ample rigidity that is capable of effectively resisting or subduing vibrations which may be caused by rotation of the agitator shaft, a unit that has effective gas-sealing means as between the shaft and the horizontal flange involving a minimum of frictional loss and wear, a unit easy to inspect, easy to service and maintain, easy to assemble and disassemble, and which unit moreover is capable of discouraging entanglement of the shaft and of the propeller with such obnoxious substances as rags, strings, paper, etc., which may have found their way into the sewage sludge.

It is among the objects to provide a self-contained individually powered agitator-propeller unit for a digester tank, which comprises all these characteristics and functions, and which nevertheless is of extreme simplicity and compactness as well as inexpensive to manufacture.

That object may be attained by providing what can be defined substantially as a vertical sheet-metal shell structure extending downward from the flange to surround the agitator shaft. This shell structure has a shaft bearing at its upper end and another one at its lower end. The upper end portion of this shell structure forms around the shaft an annular liquid holding gas-sealing chamber or compartment defined by a horizontal annular partial partition extending along and inwardly from the inner face of the shell and having a central opening for the shaft, and also having a boot or tubular vertical wall rising from the edge of the opening and surrounding the shaft in spaced relationship therewith. A downwardly open bell-shaped member concentric with the shaft is sealingly fixed thereto and surrounds the inner vertical wall portion or upstanding boot of the annular sealing compartment by extending into the annular space formed thereby. The annular sealing compartment just defined serves to receive and hold a quantity of sealing liquid in which the bell-shaped member is immersed so that gas pressure evolving from the body of sewage is confined in and by the immersed bell-shaped member that rotates with the shaft.

According to one feature, the top end of this vertical shell structure comprises a horizontal top closure plate large enough to provide a flange for sealing and fastening the unit upon the tank top, this top closure plate having a central opening wide enough to allow for the passage therethrough of the bell-shaped member in the process of assembling the unit. An auxiliary top cover plate carrying the aforementioned upper bearing for the shaft is mounted atop the top closure plate; motor drive means for the shaft are provided upon and carried by the top closure plate.

More specifically, the vertical shell structure is cylindrical resembling a drum shape and comprises a vertical length of wide diameter surrounding an intermediate portion of the total length of the agitator shaft. Anti-entanglement means are provided for the lower end portion of the shaft extending from the lower end of the drum-like shell structure and surrounded by a length of anti-entanglement tube considerably smaller in diameter than the shell structure, which narrower tube extends rigidly from the bottom end of the drum-like shell structure and into proximity with the propeller to protect the shaft as well as the propeller against entanglement with rags, strings, or similar material found in sewage.

According to still another feature, a second vertical shell structure extends upwardly from the auxiliary top plate to surround the upper end portion of the agitator shaft; a third bearing for the shaft as well as motor drive means are provided upon and carried by this second shell structure for rotating the agitator shaft.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly co-operative equivalents, are therefore intended to be embraced by those claims.

In the drawings:

Figs. 3 and 4 show the agitator-propeller unit disassembled into subassembly units, namely the vertical shell structure (Fig. 3) and the vertical propeller shaft with power drive means at the top end thereof, both Figs. 3 and 4 thus also showing the coactive portions of the gas-sealing means detached from each other.

Fig. 5 shows the agitator-propeller member detached from the shaft.

Fig. 6 is a cross-sectional view taken on line 6—6 of Fig. 3.

Figure 1:
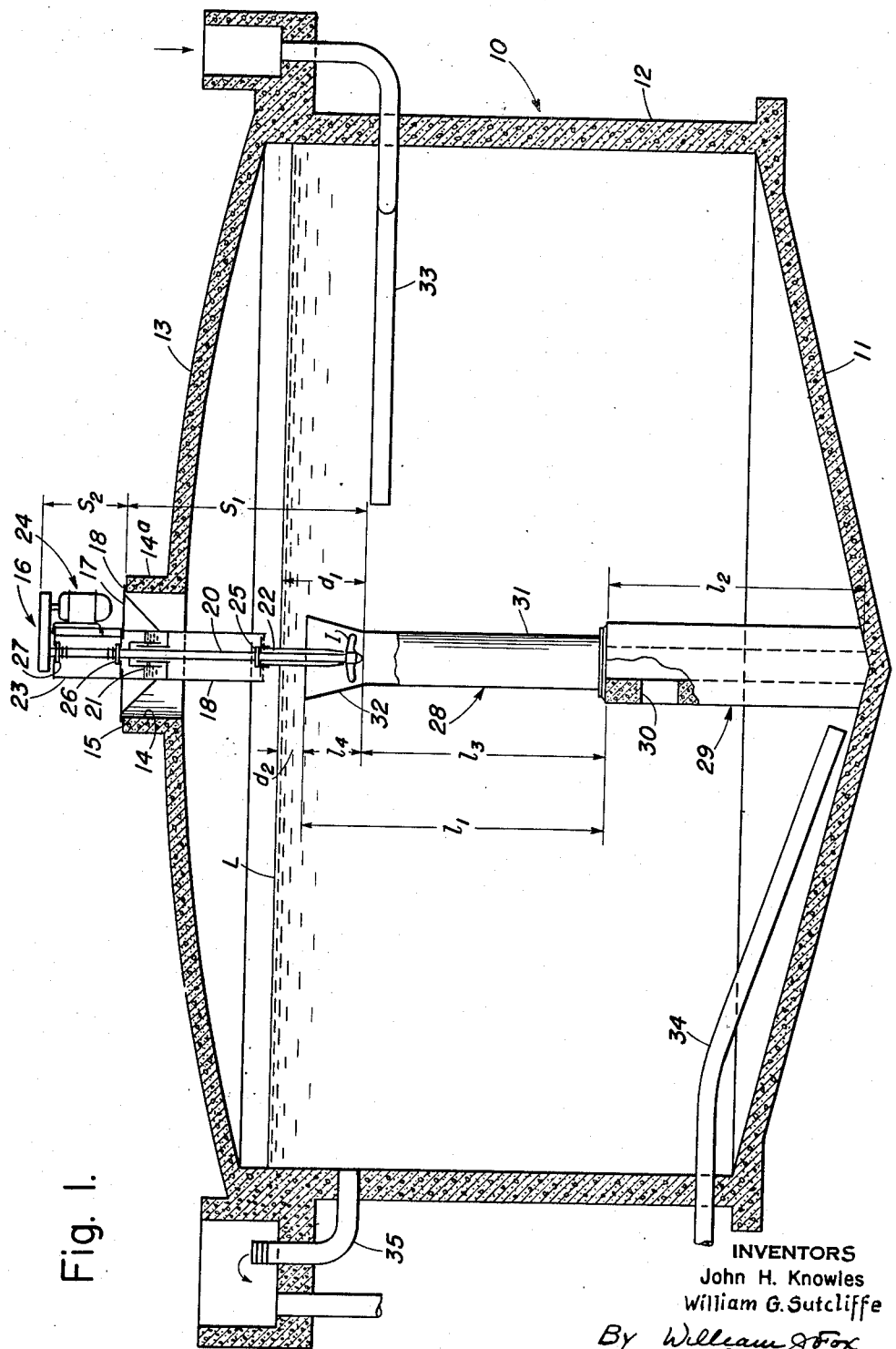
Fig. 1 is a semi-diagrammatic vertical sectional view of a digester tank provided with removable agitator-propeller unit.

The anaerobic digester in Fig. 1 is shown to comprise a concrete tank structure 10 having a bottom 11 of inverted shallow conicity with a low point at the center, a cylindrical wall 12, and a shallow domed top 13 provided with a central opening 14. The top opening 14 is defined by a peripheral cylindrical or annular portion 14a having a top face 15 upon which is supported and mounted an individually powered and self-contained agitator-propeller unit 16 in gas-sealing relationship with the top 12. A liquid level "L" in the tank indicates the body of liquid or sewage sludge under digestion.

The agitator-propeller unit 16 comprises a top cover plate 17 which provides a flange portion 18 whereby it is sealingly fastened to and supported by the top face 15 of the annular portion 14a of tank top 13. The unit 16 comprises a vertical lower section $S_1$ extending from the plate 17 down into the tank and having gas-sealing relationship with the plate 17; and an upper section $S_2$ extending upwardly from plate 17. The lower section $S_1$ extends a distance $d_1$ into the liquid body of that tank, and comprises a vertical shell or drum structure 18, a propeller I at the lower end of a vertical agitator-propeller shaft 20 coaxial with the drum structure, and a liquid-containing gas seal 21 in the upper portion of the drum structure, which is effective between the shaft 20 and the top plate 17. Furthermore, a protective anti-entanglement tube 22 for guarding the lower end portion of the shaft and for the propeller member extends rigidly from the lower end of the drum structure 18.

The section $S_2$ of unit 16 comprises a cage structure 23 and motor drive means 24 mounted thereon for rotating the shaft. The shaft is rotatable in a lower bearing 25 at the bottom of the drum structure 18, an upper bearing 26 at the upper end of the drum structure, and a third bearing 27 at the top end of the cage structure 23.

The agitator-propeller unit 16 has cooperative relationship with a vertical draft tube 28 of the length $l_1$ mounted upon a pier 29 of the length $l_2$ and having openings 30. The draft tube has a cylindrical tubular body portion 31 of the length $l_3$ and an upwardly flaring top end or mouth portion 32 of the length $l_4$ terminating a distance $d_2$ below the liquid level "L." The lower end portion of the agitator unit 16 is shown to extend into the mouth of the draft tube a distance approximately equal to that of the length $l_4$.

By rotation of the propeller member 19 in one direction liquid or sludge may be drawn into the mouth of the draft tube from the top portion of the liquid body to exit through openings 30 into an intermediate portion of that body, or the impeller member 19 may be rotated in the opposite direction if it is desired to pass the liquid sludge in the opposite direction through the draft tube.

Customary provisions are made for feeding sewage sludge as through a feed pipe 33, for withdrawing digested sludge as through a discharge pipe 34, and for overflowing supernatant sewage liquid (briefly termed "supernatant") as through an overflow pipe 35.

The agitator-propeller unit 16 of Fig. 1 will now be described in greater detail by reference to detail Figs. 2 to 9, and so that a novel relationship as between the portions or subassemblies of that unit will appear more clearly especially in view of the exploded view in Figs. 3 and 4.

The agitator-propeller unit 16 comprises one sub-assembly $A_1$ in Fig. 3 and another sub-assembly $A_2$ in Fig. 4. The two sub-assemblies $A_1$ and $A_2$ will now be described as per se, and thereafter there will be described the combination of these two sub-assemblies into the installed agitator-propeller unit shown at 16 in Fig. 1 and designated as $U_1$ in Fig. 2.

The sub-assembly $A_1$ is largely represented by a vertical shell structure 36 corresponding to the structure 17, 18, 22 of Fig. 1. The shell structure 36 comprises a top closure plate 37 provided with an opening $37^a$ and also defined by its inner diameter $D_1$ and by its outer diameter $D_2$. The top closure plate 37 has welded to its underside a drum-like vertical tubular body portion 38 (corresponding to portion 18 in Fig. 1) also defined by its height $H_1$ and its diameter $D_3$. An intermediate horizontal annular partition 39 divides the tubular body portion 38 into an upper compartment 40 also defined by its height $H_2$ and a lower compartment 41 also defined by its height $H_3$. The annular partition 39 has an opening 42 and is therefore also defined by its inner diameter $D_4$ and its outer diameter $D_3$. A boot 43 rises from the peripheral edge of opening 42 and defines together with partition 49 and with the upper end 40 of body portion 38 an annular chamber 44. Vertical anti-swirling vanes $44^a$ are shown to be provided in this annular chamber, such vanes extending radially inwardly from the outer wall of that chamber. A set of radially extending amply sized reinforcing ribs $36^a$ is welded to the closure plate 37 and to the tubular body portion 38 respectively.

The lower end of the tubular body portion 38 has welded thereto an internal horizontal flange 45 having an opening 46 defined by its diameter $D_5$, to which is fastened as by bolts 47 a bottom closure plate 48 which in turn carries at its top a lower shaft bearing 49 (corresponding to the lower shaft bearing 25 of Fig. 1).

A tube 50 to serve as what is herein termed an anti-entanglement tube has its upper end rigidly connected as by welding to the underside of bottom closure plate 48. The tube 50 is shown to have a straight portion $50^a$ and a slightly tapered or frusto-conical bottom end portion $50^b$.

The sealing chamber 40 is to receive and hold a quantity of sealing liquid and for that purpose is provided with a capped filler pipe 51.

The sub-assembly $A_2$ comprises a cage structure 52 which in turn is shown to consist of welded together portions, namely, a cylindrical body portion 53 of a height $H_4$, a bottom plate 54 and a top plate 55. The bottom plate 54 of this cage structure 52 is herein also termed auxiliary top cover plate inasmuch as it is to be fastened to the top cover plate 37 of sub-assembly $A_1$ to close the opening $37^a$ therein, as is indicated in dot-and-dash lines in Fig. 3.

An agitator-propeller shaft 56 has its top end portion $56^a$ rotatably mounted in a bearing 57 herein termed the upper bearing (corresponding to upper bearing 26 in Fig. 1) and in a third bearing 58 (corresponding to bearing 27 in Fig. 1). The upper bearing 57 is mounted as by bolts 59 upon the top side of plate 54, while the bearing 58 is fastened to the underside of plate 55. Vertical thrust collars 60 and $60^a$ are fastened upon shaft 56 within cage structure 52 and associated with the respective bearings 57 and 58 for securing the position of shaft 56 axially with respect to cage structure 52.

A drive motor "M" is vertically mounted upon the side of the cage structure 52 and has a vertical motor shaft 61. Rotation transmitting drive means such as a chain or belt drive 62 is provided between the upper end of the vertical motor shaft and the top end of the agitator-propeller shaft 56. The horizontal distance "K" between the motor shaft 61 and the propeller shaft 56 is adjustable inasmuch as the motor M is mounted upon a bracket structure 63 which is connected gate-like to the cage structure 52 by means of a pair of vertical hinges 64 and 65. That is to say, the cage structure 52 has welded thereto a pair of vertical posts in a form of angle irons 66 and 67 which together with the cage structure present a vertical frame to which the vertical motor bracket is hingedly connected. A horizontal tensioning screw 68 has threading engagement with the free vertical edge portion 69 of motor bracket 63, and bracing or tightening the tensioning screw 68 against the vertical frame structure will serve to adjust the horizontal distance "K" so as to provide the desired and proper tensioning and driving engagement for the belt or chain drive 62 upon the associated motor and agitator shafts. A downwardly open bell-shaped sealing member 70 is fixed sealingly upon the agitator shaft 56 a short distance $d_3$ below cage structure 52 and coaxial with agitator shaft 56.

Figure 2:
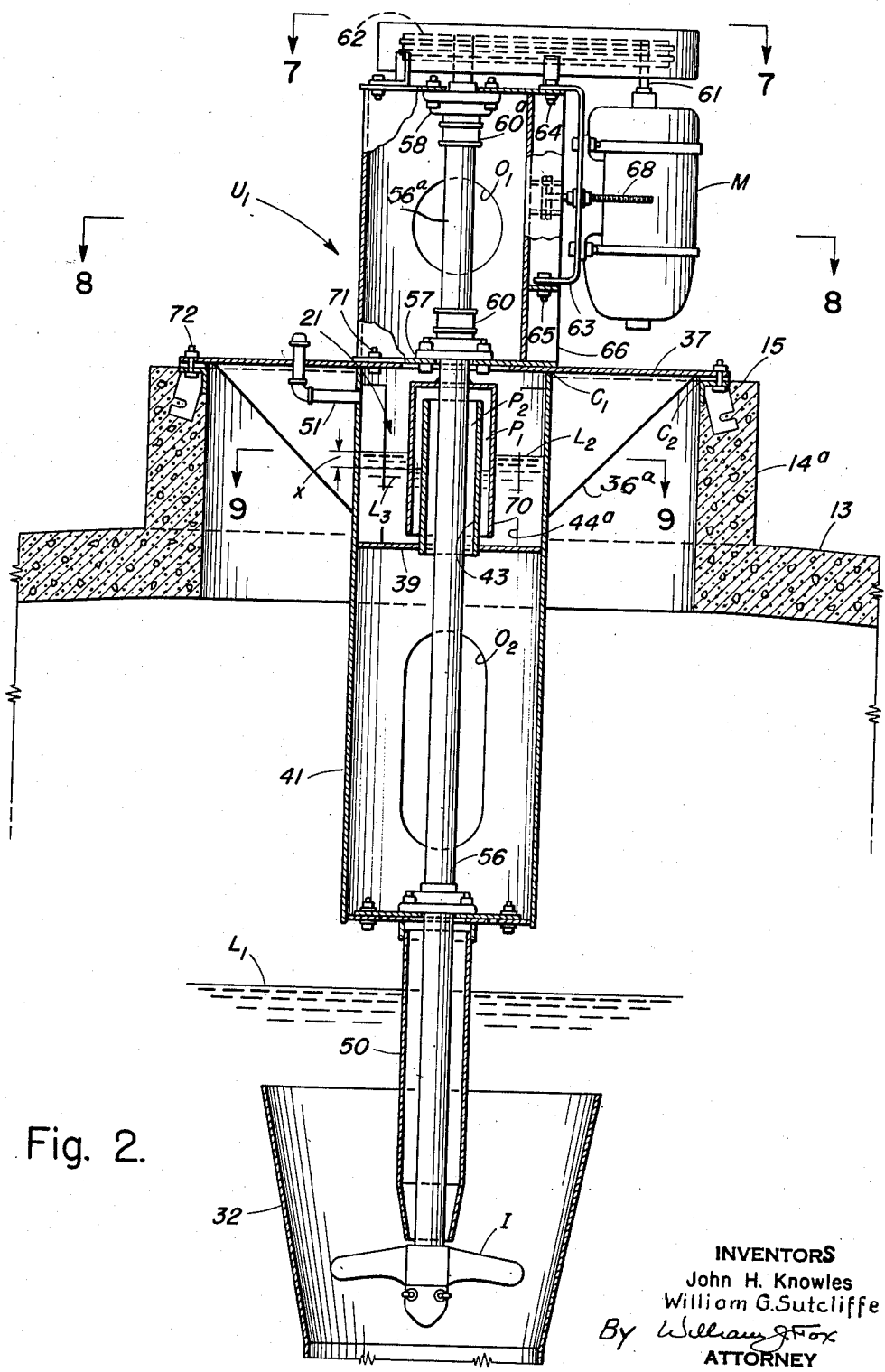
Fig. 2 is an enlarged detail view taken from Fig. 1 of the agitator-propeller unit.
Figure 8:
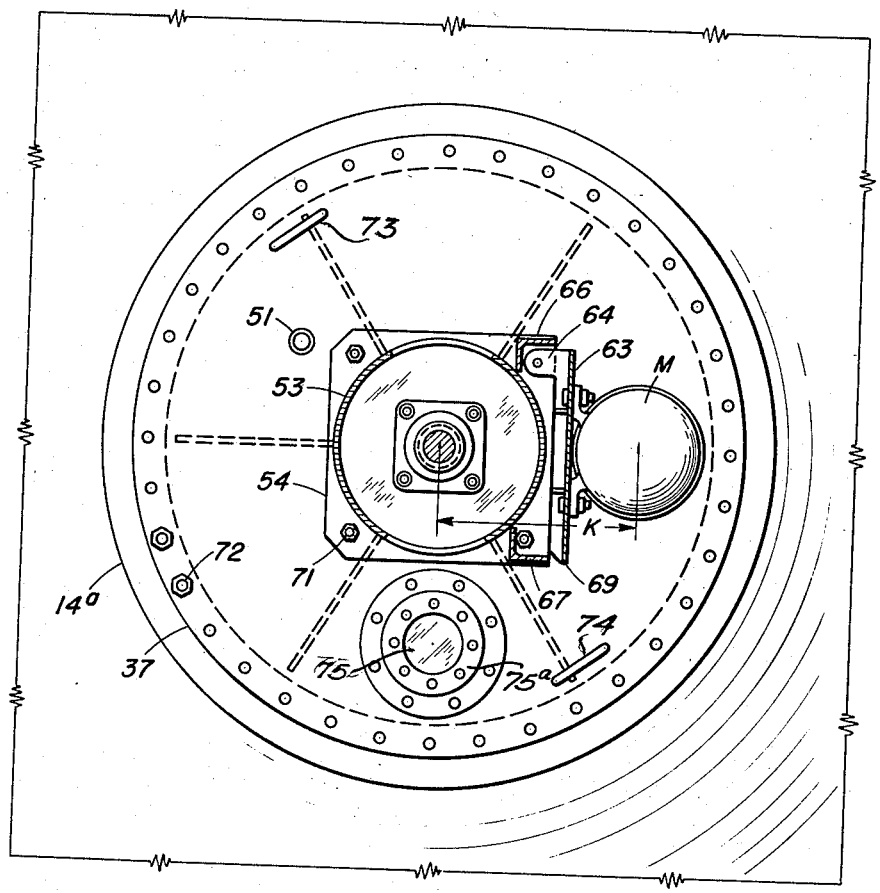
Fig. 8 is a cross-sectional view taken on line 8—8 of Fig. 2.
Figure 9:
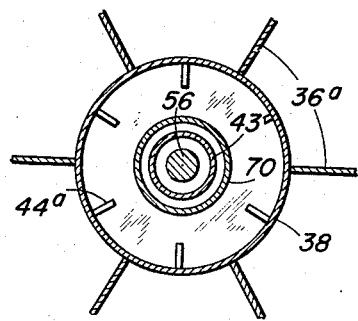
Fig. 9 is a cross-sectional view taken on line 9—9 of Fig. 2.
Figure 7:
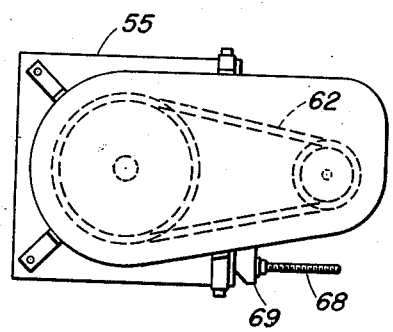
Fig. 7 is a top view taken on line 7—7 of Fig. 2.

In Fig. 2 the agitator-propeller unit $U_1$ as installed upon the tank top represents the combination in cooperative relationship of the sub-assemblies $A_1$ and $A_2$ (of Figs. 3 and 4) and with it a propeller member I. That is to say, the sub-assemblies $A_1$ and $A_2$ may be combined by inserting the agitator shaft 56 of sub-assemblies $A_2$ into the shell structure 36 of sub-assembly $A_2$. In this way, by the very act of assembling the bell-shaped sealing member 70 passes through opening $37^a$ in top cover plate 37 and thus into the sealing chamber 44 to surround the boot 43 in coaxial cooperative relationship therewith as defined by the auxiliary cover plate 54 of sub-assembly $A_2$ setting upon top cover plate 37 of sub-assembly $A_1$ and fastened thereto as by bolts 71; the top cover plate 37 in turn sets upon top face 15 and tank cover portion $14^a$ and is fastened in sealed relationship thereto as by means of anchor bolts 72.

With the agitator-propeller unit $U_1$ thus being assembled, the bolts holding the respective bearings 49, 57 and 58 of the agitator shaft may be left loose until the two sub-assemblies $A_1$ and $A_2$ are properly positioned and lined up concentrically with respect to each other, whereupon these bolts may be tightened and the propeller member "I" be mounted fixedly upon the lower end of agitator shaft 56. Hand openings $O_1$ and $O_2$ in the cage structure 52 and in the shell structure 36 respectively provide access to the bearings 49, 57 and 58 and to the bolts for fastening them.

Viewing the agitator-unit $U_1$ in Fig. 2 with regard to its operation, it is noted that there is provided in the sealing compartment 40 a quantity of sealing liquid as defined by a level "$L_2$" and supplied through filler pipe 51. Gas pressure is confined within the digester and by the digester top because of the sealing liquid in the sealing compartment blocking any possible escape of gas through concentrically annular passages $P_2$ and $P_1$ between the rotary shaft 56 and stationary boot 43, and between the stationary boot 43 and rotary bell-shaped member 70, such gas pressure being here indicated as by a differential X of liquid columns, defined by the levels $L_2$ and $L_3$ respectively of the sealing liquid within the sealing chamber.

Gas escape anywhere by way of the tank top opening 14 is furthermore blocked because of the gas tight connection provided between the shell body portion 38 and the top cover plate 37 at corner $C_1$, and because of the gas tight connection between top corner plate 77 and top opening 14 at corner $C_2$. Also, the filler pipe 51 has gas tight welded connections with the sealing chamber 40 as well as with the top cover plate 37.

The top cover plate 37 is shown to be provided for convenience with a pair of handles 73 and 74 (see Fig. 8), and with an observation glass window or handhole 75 having a removable cover or hold-down rim $75^a$.

We claim:

1. In combination with a closed digester tank having a top provided with an opening adapted to have extending therethrough a vertical agitator-propeller shaft in gas sealing relationship with the edge of said opening, an individually powered agitator-propeller unit comprising a vertically extending shell structure surrounding an intermediate portion of the length of the agitator shaft and extending from said opening downwardly into the tank, said shell structure comprising a vertical body portion, a top closure plate having a central opening and being rigidly and sealingly connected with the body portion to provide a flange portion for connection with the edge portion of said first mentioned opening, an auxiliary closure plate with an upper shaft bearing detachably mounted upon said top closure plate, a detachable bottom closure plate with bottom shaft bearing for closing the bottom end of said body portion, said shaft being rotatable in said upper and bottom bearings, means for securing the shaft against any substantial vertical axial displacement relative to said bearings, a gas sealing compartment formed in and by the upper end portion of said shell structure and comprising an intermediate annular bottom portion disposed intermediate said bearings and extending along and inwardly from the inner face of said body portion of the shell structure to provide an opening for the shaft, a vertical upwardly extending boot surrounding the shaft in spaced relationship therewith to form with said intermediate bottom portion and with the upper portion of the shell structure an annular liquid receiving sealing chamber, a downwardly open bell-shaped sealing member surrounding said boot and having fixed gas sealing relationship with the shaft to rotate therewith, said bell-shaped sealing member being adapted to be immersed in gas sealing liquid contained in said annular sealing chamber, said shaft together with said bell-shaped sealing member being upwardly removable through said top closure plate after detachment therefrom of the auxiliary closure plate, power drive means operatively associated with the upper end portion of said shaft for driving the same, mounting means rising rigidly from said auxiliary closure plate for carrying said power drive means, and an agitator-propeller member provided upon the lower end of said shaft.

2. The agitator-propeller unit according to claim 1, with the addition of an anti-entanglement tube surrounding the lower portion of the agitator shaft and extending rigidly from said bottom closure plate of the shell structure and into proximity with said propeller member.

3. The agitator-propeller unit according to claim 1, in which said mounting means comprise a cylindrical cage structure rising rigidly from said auxiliary closure plate and having at the top a third bearing for the agitator shaft with a free end thereof extending upwardly from that bearing, in which the said power drive comprises a motor vertically mounted on the outside of said cage structure, endless power transmitting means between the upper free end of the motor shaft and the upper free end of the agitator shaft, with the addition of adjusting means for adjusting the horizontal distance between the motor shaft and the agitator shaft.

4. In combination with a closed digester tank having a top provided with an opening adapted to have extending therethrough a vertical agitator-propeller shaft in gas-sealing relationship with the edge of said opening, an agitator-propeller unit comprising a vertically extending shell structure surrounding an intermediate portion of the length of the agitator shaft and extending from said opening downwardly into the tank, said shell structure comprising a vertical body portion, a top closure plate having a central opening and being rigidly and sealingly connected with the body portion to provide a flange portion for connection with the edge portion of said first mentioned opening, an upper detachable shaft bearing supported by said top closure plate, a bottom shaft bearing mounted at and supported by the lower end portion of said shell structure, said shaft being rotatable in said upper and bottom bearings, means for securing said shaft against any substantial axial displacement in and relative to said bearings, a gas sealing compartment formed in and by the upper end portion of said shell structure and comprising an intermediate annular bottom portion disposed intermediate said bearings and extending along and inwardly from the inner face of said body portion of the shell structure to provide an opening for the shaft, a vertically upwardly extending boot surrounding the shaft in spaced relationship therewith to form with said intermediate bottom portion and with the upper portion of the shell structure an annular liquid receiving sealing chamber, a downwardly open bell-shaped sealing member surrounding said boot and having fixed gas sealing relationship with the shaft to rotate therewith, said bell-shaped sealing member being adapted to be immersed in gas-sealing liquid in said annular sealing chamber, said shaft together with said bell-shaped sealing member being upwardly removable through the opening in said top closure plate after detachment of said upper bearing, an agitator propeller member provided upon the lower end of said shaft, and power drive means operatively connected with the upper end portion of said shaft for driving the same.

JOHN H. KNOWLES.
WILLIAM G. SUTCLIFFE.

References Cited in the file of this patent

UNITED STATES PATENTS

| Number | Name | Date |
|---|---|---|
| 1,175,147 | Howard | Mar. 14, 1916 |
| 1,418,295 | Leader et al. | June 6, 1922 |
| 2,054,395 | Streander | Sept. 15, 1936 |
| 2,063,301 | Durbin | Dec. 8, 1938 |
| 2,293,183 | Walker | Aug. 18, 1942 |
| 2,318,181 | Myers | May 4, 1943 |